(12) United States Patent
Pinto

(10) Patent No.: US 11,111,019 B2
(45) Date of Patent: Sep. 7, 2021

(54) SYSTEM AND METHOD FOR CAPTURING AND RELEASING FIXED-WING AIRCRAFT

(71) Applicant: Ryan Evaristo Pinto, Salcette (IN)

(72) Inventor: Ryan Evaristo Pinto, Salcette (IN)

(73) Assignee: Ryan Evaristo Pinto, Salcette (IN)

( * ) Notice: Subject to any disclaimer, the term of this patent is extended or adjusted under 35 U.S.C. 154(b) by 388 days.

(21) Appl. No.: 15/780,582

(22) PCT Filed: Dec. 11, 2017

(86) PCT No.: PCT/CA2017/051495
§ 371 (c)(1),
(2) Date: May 31, 2018

(87) PCT Pub. No.: WO2018/107278
PCT Pub. Date: Jun. 21, 2018

(65) Prior Publication Data
US 2019/0329886 A1 Oct. 31, 2019

Related U.S. Application Data

(60) Provisional application No. 62/433,623, filed on Dec. 13, 2016.

(51) Int. Cl.
*B64D 5/00* (2006.01)
*B64D 9/00* (2006.01)
*B64C 37/02* (2006.01)

(52) U.S. Cl.
CPC ............... *B64D 5/00* (2013.01); *B64D 9/00* (2013.01); *B64C 37/02* (2013.01);
(Continued)

(58) Field of Classification Search
CPC ..... B64D 5/00; B64C 37/02; B64C 2201/082; B64C 2201/182; B64C 2201/206
See application file for complete search history.

(56) References Cited

U.S. PATENT DOCUMENTS

| 2,843,337 A | 7/1958 | Bennett |
| 3,088,693 A | 5/1963 | Brown |

(Continued)

FOREIGN PATENT DOCUMENTS

| CN | 105129081 A | 12/2015 |
| CN | 106043689 A | 10/2016 |

(Continued)

OTHER PUBLICATIONS

International Search Report & Written Opinion—PCT/CA2017/051495 dated Apr. 4, 2018.
(Continued)

*Primary Examiner* — Philip J Bonzell
*Assistant Examiner* — Tye William Abell

(57) ABSTRACT

A capture-and-release aircraft for capturing and releasing fixed-wing aircraft is provided. The capture-and-release aircraft comprises a frame to which is secured a set of rotor units. Each rotor unit has a rotor with a rotation axis, the rotation axes of the rotors being generally parallel. A set of aircraft engagement members is also secured to the frame that can align with a set of anchors of a fixed-wing aircraft to releasably couple with the anchors.

16 Claims, 13 Drawing Sheets

(52) U.S. Cl.
CPC .. *B64C 2201/027* (2013.01); *B64C 2201/082* (2013.01); *B64C 2201/108* (2013.01)

(56) References Cited

U.S. PATENT DOCUMENTS

| | | | |
|---|---|---|---|
| 4,267,987 A * | 5/1981 | McDonnell | B64D 39/00 244/137.4 |
| 4,678,141 A * | 7/1987 | Sarrantonio | B64C 37/02 244/2 |
| 4,757,959 A | 7/1988 | Schroder et al. | |
| 5,000,398 A | 3/1991 | Rashev | |
| 6,086,015 A | 7/2000 | MacCready, Jr. | |
| 6,869,042 B2 | 3/2005 | Harrison | |
| 7,530,527 B2 | 5/2009 | Kelleher | |
| 7,967,238 B2 | 6/2011 | Fuchs et al. | |
| 8,820,681 B2 | 9/2014 | Brutoco | |
| 8,950,698 B1 | 2/2015 | Rossi | |
| 2004/0089767 A1 | 5/2004 | Harrison | |
| 2006/0278757 A1 | 12/2006 | Kelleher | |
| 2007/0187547 A1 * | 8/2007 | Kelly | B64B 1/30 244/7 R |
| 2009/0065639 A1 | 3/2009 | Hazan | |
| 2009/0302149 A1 | 12/2009 | Fuchs et al. | |
| 2013/0175382 A1 | 7/2013 | Brutoco | |
| 2013/0200206 A1 * | 8/2013 | Hsieh | B64D 5/00 244/2 |
| 2014/0032034 A1 | 1/2014 | Raptopoulos et al. | |
| 2014/0117147 A1 * | 5/2014 | Hanna | B64C 39/024 244/2 |
| 2015/0115096 A1 * | 4/2015 | Rossi | B64C 27/26 244/2 |
| 2015/0314871 A1 | 11/2015 | von Flotow | |
| 2016/0327945 A1 * | 11/2016 | Davidson | G01S 19/13 |
| 2017/0036762 A1 * | 2/2017 | Gamble | B64D 5/00 |
| 2017/0158318 A1 | 6/2017 | von Flotow et al. | |
| 2017/0274997 A1 * | 9/2017 | von Flotow | B64C 39/024 |

FOREIGN PATENT DOCUMENTS

| | | |
|---|---|---|
| CN | 106741958 A | 5/2017 |
| CN | 106915444 A | 7/2017 |
| CN | 106927048 A | 7/2017 |
| CN | 106965934 A | 7/2017 |
| CN | 106965935 A | 7/2017 |
| DE | 102016014309 A1 | 1/2018 |
| EP | 3127809 A1 | 2/2017 |
| WO | 2006109288 A2 | 10/2006 |
| WO | 2014204550 A2 | 12/2014 |

OTHER PUBLICATIONS

Supplementary European Search Report for EP Application No. 17 88 0527 dated Jun. 29, 2020.

* cited by examiner

SYSTEM AND METHOD FOR CAPTURING AND RELEASING FIXED-WING AIRCRAFT

CROSS-REFERENCE TO RELATED APPLICATIONS

This application is a National Stage of International Application No. PCT/CA2017/051495, filed Dec. 11, 2017, which claims the benefit of U.S. Provisional Application No. 62/433,623, filed Dec. 13, 2016, the contents of both of which are incorporated herein by reference in their entirety.

FIELD

The following relates generally to aircraft. In particular, the following relates to a system and method for capturing and releasing fixed-wing aircraft.

BACKGROUND OF THE DISCLOSURE

Fixed-wing aircraft are capable of flight using wings that generate lift caused by the rapid travel of air over the fixed wings. The fixed wings have an airfoil shape, causing the air pressure on the top of the wing to be reduced relative to the air pressure on the bottom of the wing when air travels above and below the fixed wings in a general direction, resulting in lift. In order to cause air to travel above and below the fixed wings to generate sufficient lift to keep the fixed-wing aircraft airborne, such fixed-wing aircraft are propelled via any one of a number of manners, such as one or more turbojet engines, turboprop engines, electric propeller engines, etc. Fixed-wing aircraft can travel at relatively high speeds for long distances, can transport relatively heavy payloads, and are generally very fuel efficient.

In order for this lift to enable the fixed-wing aircraft to take off, fixed-wing aircraft generally accelerate along a runway until sufficient speed is achieved. These runways tend to require significant space, as they have to be sufficiently long to enable the fixed-wing aircraft to achieve sufficient speed and, thus, lift, and to permit sufficient distance to touch down, decelerate, and stop the aircraft. As a result, such runways and airports are built outside of urban centers or occupy very expensive land within urban centers. Furthermore, the design of the fixed-wing aircraft and its engines are a compromise to satisfy the need for a large amount of thrust and lift required during takeoff and rapid ascent and the need to maintain thrust and efficiency at the much higher cruising speeds which is generally where the fixed-wing aircraft spends most of its operational time. These two design objectives are often in direct conflict with each other, which is why it's generally infeasible to design a vertical take-off and landing ("VTOL") aircraft that simultaneously is fuel efficient, has a long range, can travel at very high velocities, and carry heavy loads, all while keeping the design simple and build costs low. By removing the need for fixed-wing aircraft to take off on their own, they can be built for maximum range, speed, carrying capacity and fuel efficiency.

In contrast, rotary-wing aircraft have "wings" that form one or more rotors mounted on a spinning shaft and rely on motor speed to build sufficient lift for flight. As a result, rotary-wing aircraft require relatively small takeoff and landing space compared to fixed-wing aircraft as they can take off substantially vertically. Rotary-wing aircraft, however, cannot generally achieve the same speeds, range, and payload capacities as possible with fixed-wing aircraft.

SUMMARY OF THE DISCLOSURE

In one aspect, there is provided a capture-and-release aircraft for capturing and releasing fixed-wing aircraft, comprising a frame, a set of at least three rotor units secured to the frame, each rotor unit having a rotor with a rotation axis, the rotation axes of the rotors being generally parallel, and a set of aircraft engagement members secured to the frame, each of the aircraft engagement members comprising an anchor-capture device that is alignable with a corresponding one of a set of anchors of a fixed-wing aircraft to releasably couple to the corresponding one of the set of anchors.

The rotor units can be secured at positions so that, when the aircraft engagement members retain the set of anchors of the fixed-wing aircraft via the anchor-capture devices, downwash from the rotor units is generally unimpeded by the fixed-wing aircraft. The set of the rotor units can comprise at least four rotor units secured at distal points on the frame such that each of the at least four rotor units is disposed in a quadrant defined by a major axis of a fuselage and the main fixed wings of the fixed-wing aircraft when the set of aircraft engagement members retain the set of anchors of the fixed-wing aircraft.

Each of the set of aircraft engagement members can comprise an articulating arm coupled to the anchor-capture device for aligning the anchor-capture device with the corresponding one of the set of anchors of the fixed-wing aircraft. The articulating arm can enable adjustment of a position of the anchor-capture device to align with and capture the corresponding one of the set of anchors of the fixed-wing aircraft.

Each of the aircraft engagement members can further comprise at least one motor, and a set of sensors for detecting an alignment of the anchor-capture device coupled to the articulating arm of the aircraft engagement member with the corresponding one of the set of anchors of the fixed-wing aircraft, and the capture-and-release aircraft can further comprise a guidance system coupled to the set of sensors and the at least one motor to align the anchor-capture device with the corresponding one of the set of anchors.

The set of sensors can comprise optical sensors. The guidance system can process data from the set of sensors to detect an optical pattern one of on or adjacent to the corresponding one of the set of anchors to facilitate detection of the alignment of the anchor-capture devices with the anchors of the fixed-wing aircraft. The optical pattern can comprise a light-emitting beacon. The optical pattern can comprise a pattern of demarcations on a surface of the anchors of the fixed-wing aircraft. The optical pattern can comprise a pattern of demarcations on a surface of the fixed-wing aircraft adjacent the anchors of the fixed-wing aircraft. The optical sensors can be positioned on the anchor-capture device.

Each of the anchor-capture devices can comprise an anchor receptacle in which one of the anchors is received. The sensors can comprise optical sensors positioned on an inner and/or outer surface of the anchor receptacles.

The aircraft engagement members can comprise proximity sensors for detecting an engageable position of the anchors of the fixed-wing aircraft.

The capture-and-release aircraft further can comprise a cargo container secured to the frame, and each of the aircraft engagement members can further comprise at least one motor that, when the anchor-capture devices are coupled to the anchors of the fixed-wing aircraft, can move the cargo container between a first position in which the cargo container is spaced from the fixed-wing aircraft and a second position in which the cargo container is adjacent the fixed-wing aircraft.

BRIEF DESCRIPTION OF THE DRAWINGS

Embodiments will now be described, by way of example only, with reference to the attached Figures, wherein.

DETAILED DESCRIPTION

Figure 1:
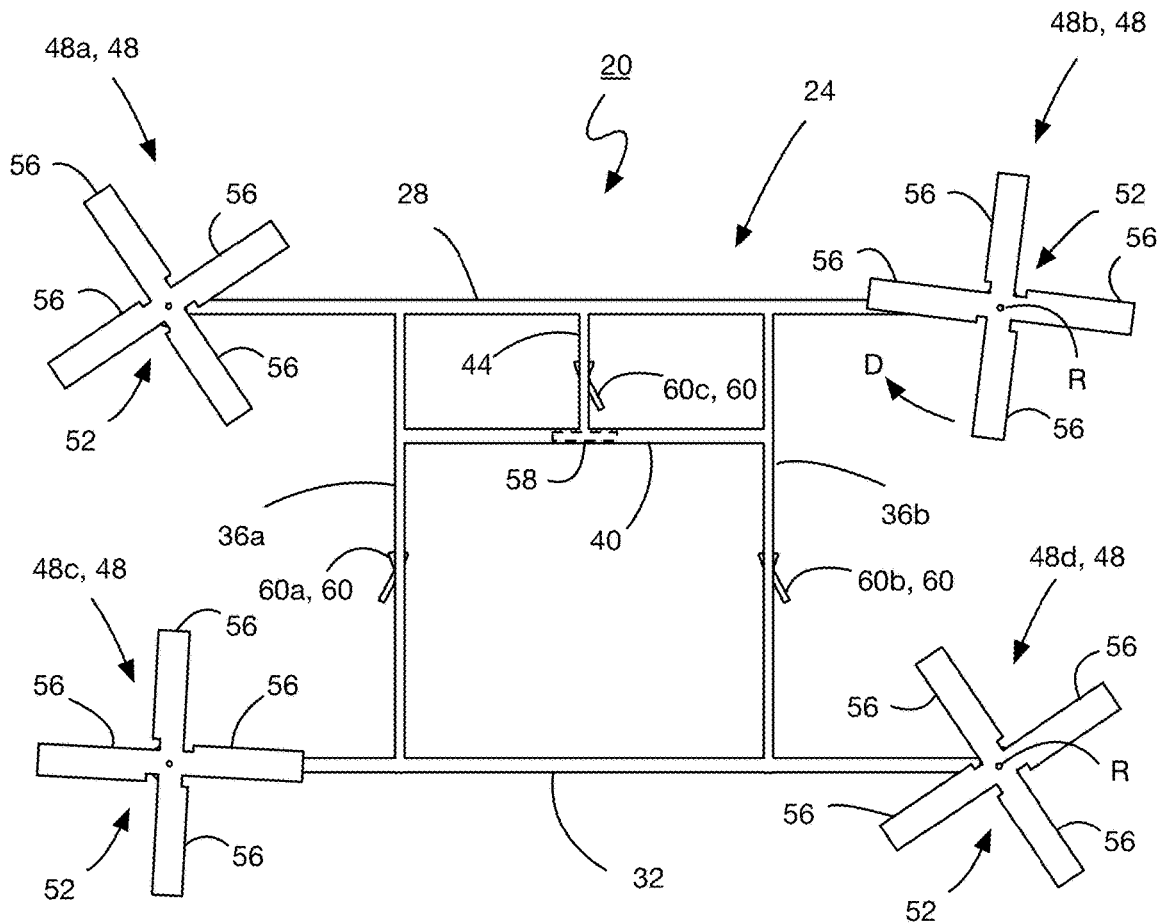
FIG. 1 is a top schematic view of a capture-and-release system for capturing and releasing fixed-wing aircraft in accordance with one embodiment thereof.

For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Described herein are capture-and-release aircraft used to capture and release fixed-wing aircraft for take-off and landing of the fixed-wing aircraft. A capture-and-release aircraft having a frame to which at least three rotor units with parallel rotation axes are coupled thereto also has a set of anchor-capture devices secured to the frame, the anchor-capture devices being alignable with and releasably retaining a set of anchors of a fixed-wing aircraft. The capture-and-release aircraft is able to capture and release fixed-wing aircraft, enabling their take-off and landing using a reduced ground area.

Figure 2:
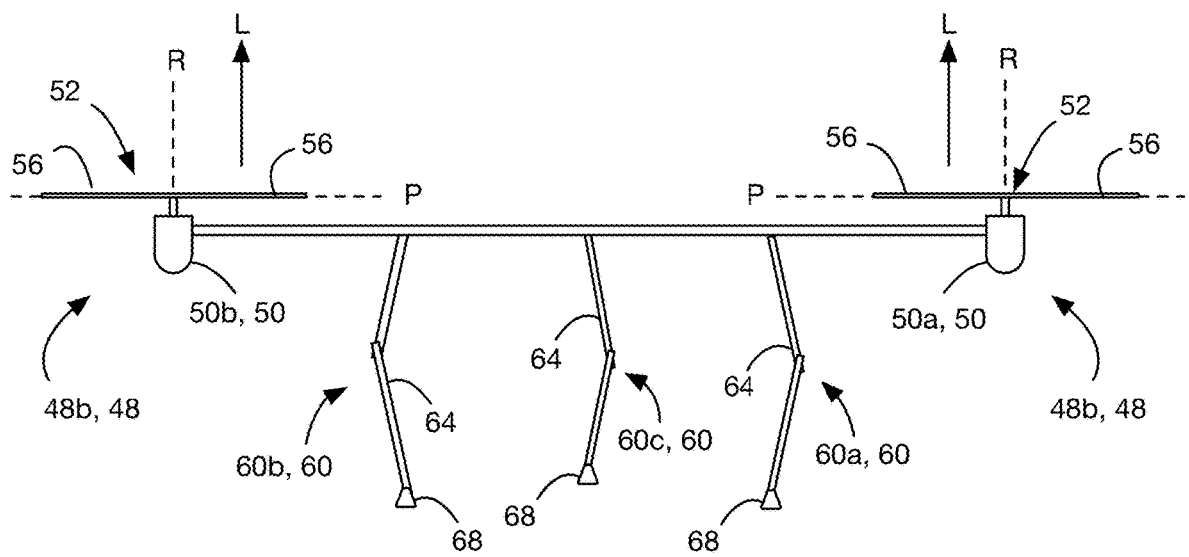
FIG. 2 is a front schematic view of the capture-and-release system of FIG. 1.

FIGS. 1 and 2 are schematic views of a capture-and-release aircraft 20 for capturing and releasing fixed-wing aircraft in accordance with an embodiment. The capture-and-release aircraft 20 is shown for illustration purposes only, and actual production embodiments may vary depending on the application.

The capture-and-release aircraft 20 has a frame 24 that includes a front cross-member 28 and a rear cross-member 32 that are spanned by two lateral members 36a, 36b. An intermediate cross-member 40 bridges the two lateral members 36a, 36b between the front cross-member 28 and the rear cross-member 32. A medial member 44 spans between the intermediate cross-member 40 and the front cross-member 28. The frame 24 is constructed primarily of aluminum, but can be made from any other suitable material.

Four rotor units 48a, 48b, 48c, and 48d (collectively, rotor units 48) are secured to the lateral ends of the front cross-member 28 and the rear cross-member 32. Each rotor unit 48 includes a motor 50 that drives a rotor 52 having four blades 56. The four blades 56 of the rotor 52 loosely define a plane P. The blades 56 are pitched relative to the plane of the rotor 52 and generate an upward force L, generally referred to as lift, when the rotor 52 is rotated in a rotation direction D about a rotation axis R. The rotation axes R of the rotor units 48 are generally parallel, and the planes P of the rotors 52 are generally co-planar.

The capture-and-release aircraft 20 differs from traditional helicopters that use rotors which are able to vary the pitch of their blades dynamically as they move around the rotor hub to accelerate in a certain direction horizontally and to yaw.

Two of the motors 50b and 50c drive their respective rotors 52 clockwise and the other two motors 50a and 50d drive their respective rotors 52 counter-clockwise. The use of independent variation of the speed of each rotor 52 provides directional and speed control to the capture-and-release aircraft 20. By changing the speed of each motor 50 and thus of each rotor 52, a desired total lift can be generated, its center can be controlled both laterally and longitudinally, and a desired total torque, or turning force, can be generated to cause the capture-and-release aircraft 20 to yaw either right or left.

The motors 50 and rotors 52 have characteristics that define a maximum load weight that the capture-and-release aircraft 20 can safely capture mid-flight and guide to touch down, and pick up from a stationary position on the ground and accelerate to a minimum flying speed for a fixed-wing aircraft.

A central controller 58 is contained within the intermediate cross-member 40 of the frame 24, and includes an auto-pilot system and controls the general operation of the capture-and-release aircraft 20. The central controller 58 determines the general position of a fixed-wing aircraft to be captured and controls the motors 50 to guide the capture-and-release aircraft 20 to a position for engaging the fixed-wing aircraft. In addition, the central controller 58 is programmed to control the capture-and-release aircraft 20 during landing and take-off routines. The central controller 58 is informed of the GPS co-ordinates, flight trajectory and identification of the fixed-wing aircraft, either via an external communication authority or directly from the fixed-wing aircraft itself. Still further, the central controller 58 includes a guidance system that controls the capture and release of fixed-wing aircraft as will be described below.

Three aircraft engagement members 60 are secured to and extend under the frame 24. Two of the aircraft engagement members 60a and 60b are secured to the lateral members 36a and 36b respectively, and a third aircraft engagement member 60c is secured to the medial member 44. The use of at least three aircraft engagement members 60 enables the capture-and-release aircraft 20 to securely and stably capture and transport a fixed-wing aircraft 100, even with more challenging wind conditions.

Each aircraft engagement member 60 includes an articulating arm 64 and an anchor-capture device 68 coupled to the articulating arm 64 at a distal end thereof. Each articulating arm 64 is a robotic arm controlled by the central controller 58 and has three or more degrees of freedom. The articulating arms 64 are of sufficient length so that when they are fully extended, the capture-and-release aircraft 20 is a safe distance above the top of the fixed-wing aircraft 100. This safe distance is approximately half the total nose-to-tail length of the fixed-wing aircraft and is determined by the stability of flight characteristics of both the capture-and-release aircraft 20 and the fixed-wing aircraft under the wind conditions at the time of engagement.

Figure 3:
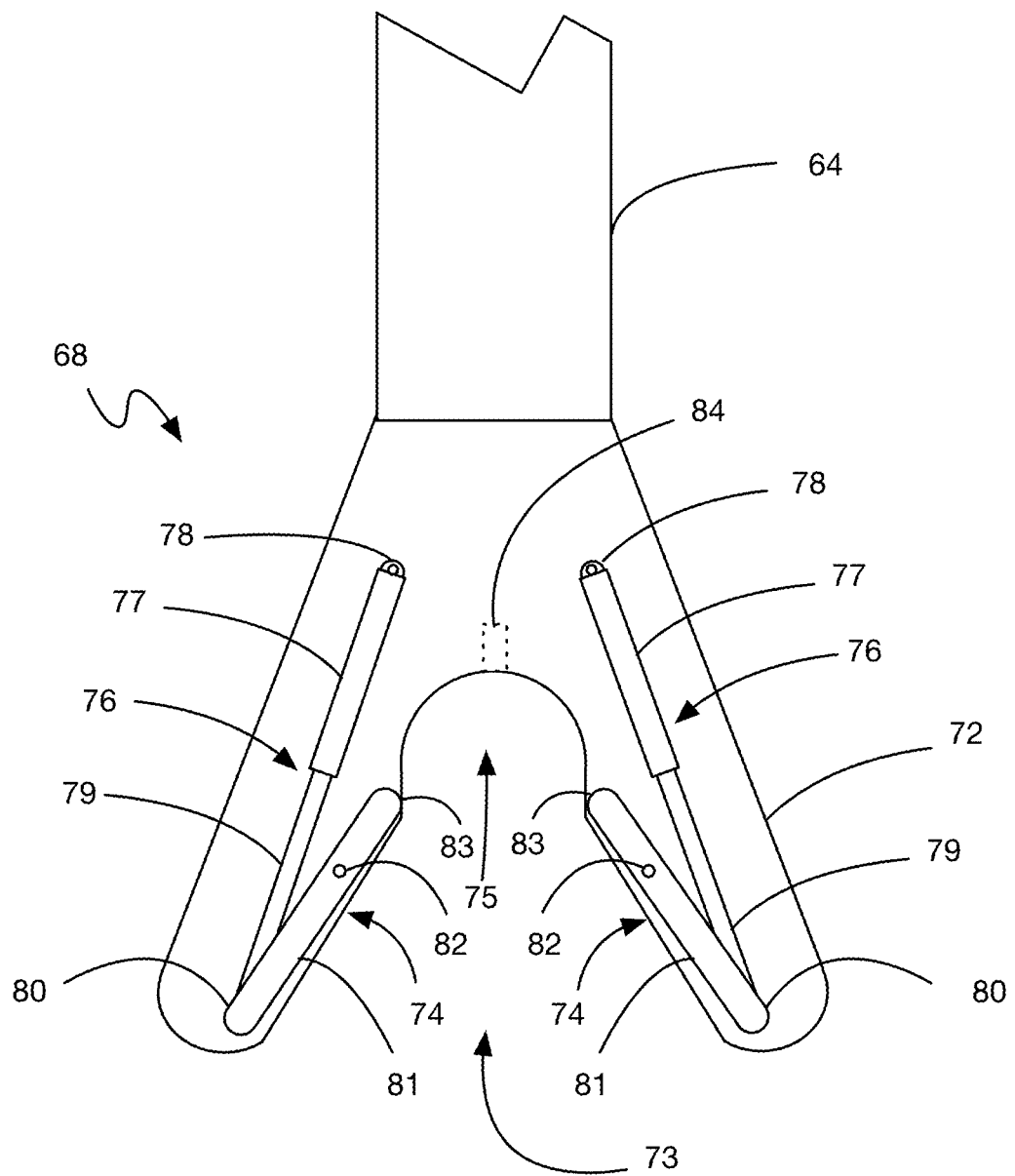
FIG. 3 is a partial section view of an anchor-capture device of the capture-and-release system of FIG. 1 before capture of a fixed-wing aircraft.

FIG. 3 shows a sectional view of the anchor-capture device 68 in greater detail. The anchor-capture device 68 has a generally conical body 72 coupled to the articulating arm 64 at a first end and a generally conical opening 73 at a second end. The generally conical opening 73 has a frusto-conical surface 74 to guide an anchor over which the anchor-capture device 68 is placed to an anchor receptacle 75 that is dimensioned to receive the anchor somewhat snugly.

The anchor-capture device 68 has a set of anchor-locking members 76 radially disposed within the generally conical body 72, two of which are shown in FIG. 3. Each anchor-locking member 76 has a hydraulic cylinder 77 pivotally secured at a first end 78 thereof in the generally conical body 72. A piston 79 extends from the hydraulic cylinder 77 and is pivotally coupled at its distal end 80 to the first end of an engagement member 81. The engagement member 81 is pivotally secured within the generally conical body 72 at a medial point 82 along its length.

Extension of the piston 79 of the hydraulic cylinder 77 pivots the engagement member 81 to a release position within the profile of the generally conical body 72. Withdrawal of the piston 79 into the hydraulic cylinder 77 pivots the engagement member 81 to a locking position in which a second anchor-engaging end 83 extends into the generally conical opening 73.

A sensor unit 84 that includes a set of one or more sensors is positioned inside of the generally conical body 72 inside of the anchor receptacle 75. In particular, the sensor unit 84 includes an imaging element, such as a lens, and an image sensor, which may be, for example, a CCD sensor or a CMOS sensor, that is positioned to receive images from the imaging element. The sensor unit 84 is configured to transmit images it captures to the guidance system of the central controller 58, which processes the captured images to identify the position of an anchor to be engaged. In response, the central controller 58 controls both the flight of the capture-and-release aircraft 20, articulation of the articulating arm 64 to position the anchor-capture device 68 via the guidance system once the fixed-wing aircraft is in position for engaging, and operation of the anchor-locking member 76 to engage an anchor once the anchor-locking member 76 is positioned over the anchor.

In addition, the sensor unit 84 includes a range finder sensor to determine the distance between the sensor unit 84 and an anchor.

Figure 4:
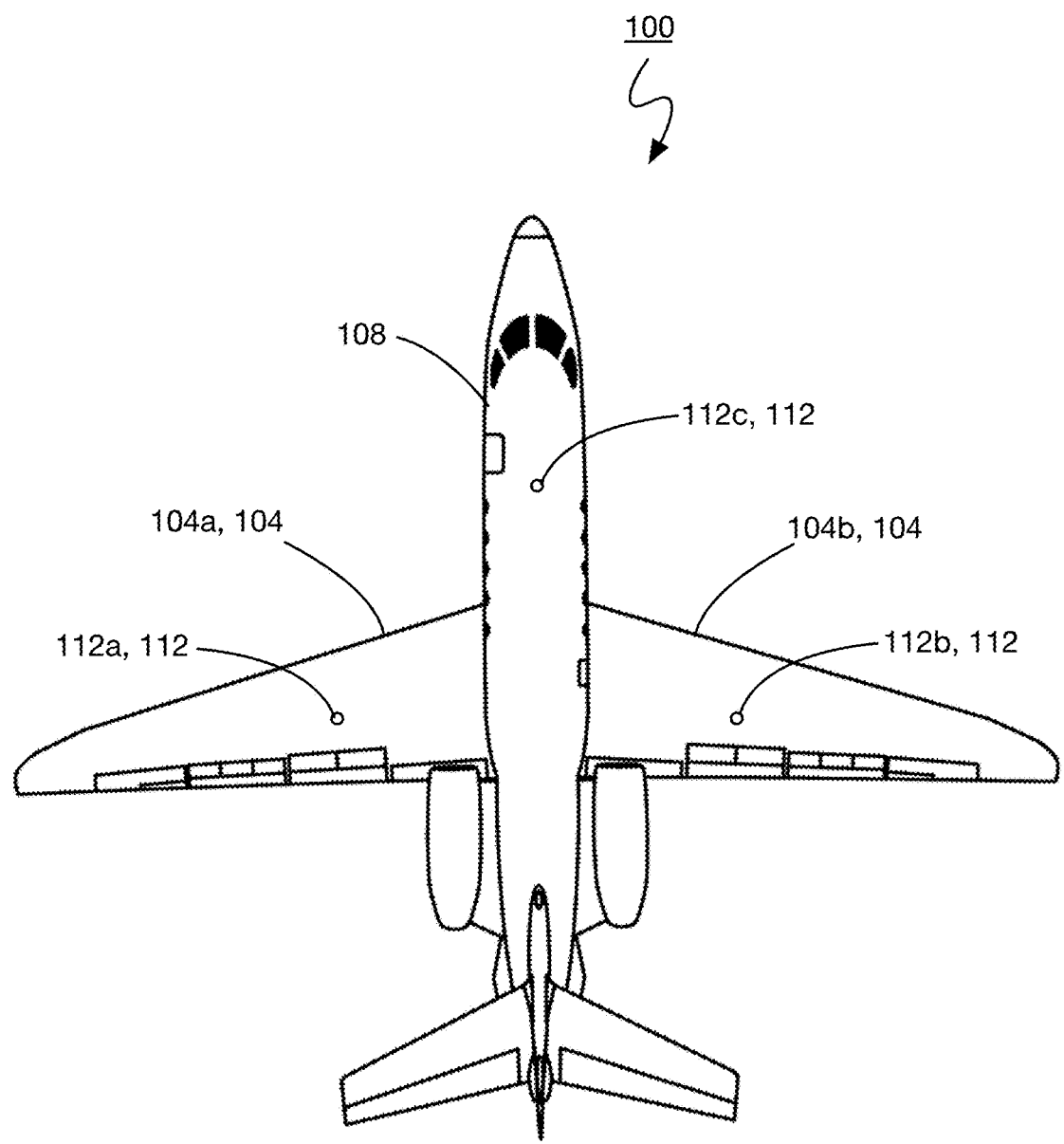
FIG. 4 is a top view of a fixed-wing aircraft adapted for use with the capture-and-release system of FIG. 1.
Figure 5:
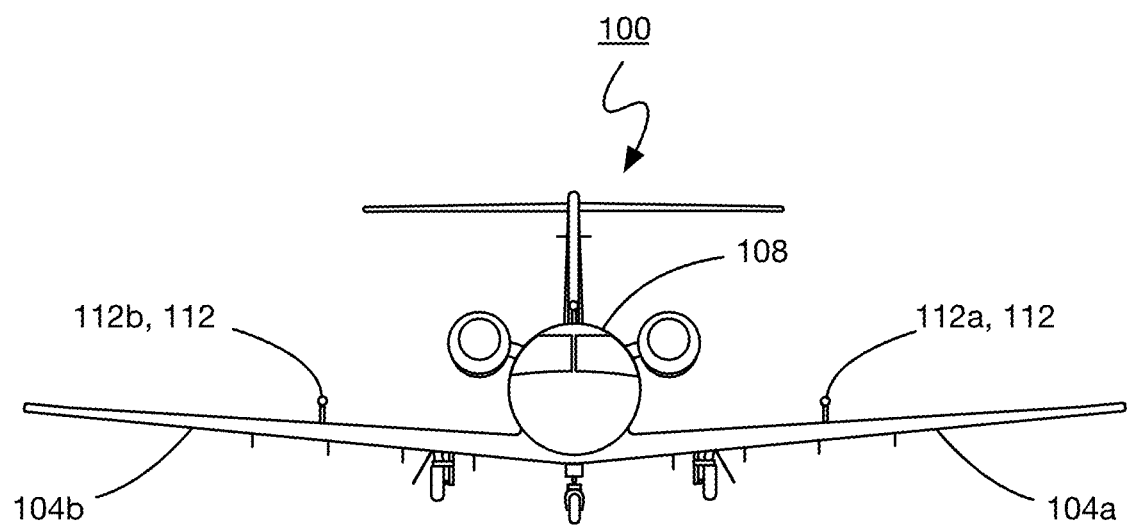
FIG. 5 is a front view of the fixed-wing aircraft of FIG. 4.

FIGS. 4 and 5 shows a fixed-wing aircraft 100 that is adapted for use with the capture-and-release aircraft 20. The fixed-wing aircraft 100 has two fixed wings 104a, 104b that extend laterally from a fuselage 108. In particular, the fixed-wing aircraft 100 has a set of anchors 112 extending upward from an upper surface thereof. A first anchor 112a extends upwardly from an upper surface of one of the wings 104a, a second anchor 112b extends upwardly from an upper surface of the other of the wings 104b, and a third anchor 112c extends upwardly from an upper surface of the fuselage.

Figure 6:
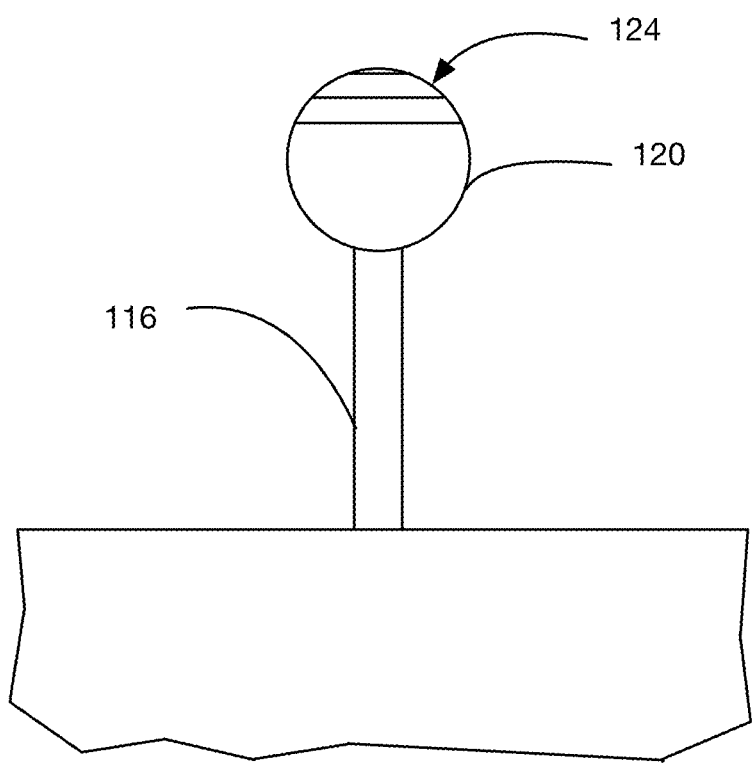
FIG. 6 is a partial front view of an anchor of the fixed-wing aircraft of FIG. 4.

FIG. 6 shows an anchor 112 in greater detail. The anchor 112 has a stem portion 116 and a ball portion 120. The ball portion 120 is generally spherical and affixed to the stem portion 116 at a first end thereof. Both the stem portion 116 and the ball portion 120 are made of steel, but can be made of any suitable material having a strength to support both the weight of the fixed-wing aircraft 100 and its maximum load, as well as additional tolerance, and handle stresses on the anchor 112 as a result of wind turbulence. The anchor 112 is designed to be retractable. In particular, a second end of the stem portion 116 is pivotally connected to a frame structure of the fixed-wing aircraft 100 and is pivotable, when unlocked, between a retracted position, in which it is recessed within the fixed-wing aircraft 100 when not needed, and an upright position, in which the anchor 112 extends from the fixed-wing aircraft 100 as shown in FIG. 6 when the anchor 112 is needed. The anchors 112 are lockable in the retracted position and the upright position.

The anchor 112 has an optical pattern 124 that is exposed on its top surface when the anchor 112 is in the upright position. In particular, the optical pattern is a pattern of demarcations on a surface of the anchor 112 that facilitates identification and alignment to the anchor 112 by the aircraft engagement members 60 of the capture-and-release aircraft 20. In the illustrated embodiment, the pattern of demarcations includes a set of concentric rings that form a bullseye when viewed from above. Further, each anchor 112a, 112b, and 112c is provided with a different optical pattern 124, in that distinctly different colors are used in the bullseye optical patterns 124 for each anchor 112. This enables quick confirmation that each aircraft engagement member 60 is aligned with the correct anchor 112.

The features and the number of the aircraft engagement members 60, give the aircraft engagement members 60 flexibility and accuracy when it comes to targeting, engaging and locking on to the anchors on a fixed wing aircraft. The anchors 112 are placed at strategic points and sufficiently apart on the fixed-wing aircraft 100 to provide stability and balance when captured. The arrangement of anchors 112 on the fixed-wing aircraft 100 takes into account the fact that the fixed-wing aircraft 100 is designed with its center of gravity ahead of the center of lift (i.e., the center of pressure). The two anchors 112a, 112b are situated on the top surface of the wings 104a and 104b respectively, approximately halfway between the central axis of the fuselage 108 and the tips of the wings 104. The third anchor 112c is along the central axis of the fuselage 108 and near the front of the fixed wing aircraft 100. The three anchors 112 are thus sufficiently spread apart so as to increase the ability of the capture-and-release aircraft 20 to balance and stabilize the fixed-wing aircraft 100 when the aircraft engagement members 60 are coupled to the anchors 112.

When it is desired to capture the fixed-wing aircraft 100 in flight, the fixed-wing aircraft 100 is flown using autopilot and its speed is reduced to a minimum safe airspeed to reduce irregularities in its flight trajectory without being in danger of stalling. It may be acceptable to have the fixed-wing aircraft 100 descend slightly at this stage. In addition, the anchors 112 of the fixed-wing aircraft 100 are extended to an upright position and locked. The capture-and-release aircraft 20 takes flight and is aligned over the fixed-wing aircraft 100. The alignment is achieved by the central controller 58 by taking into account the GPS co-ordinates, trajectory as well as visual tracking of the fixed-wing aircraft.

Figure 7A:
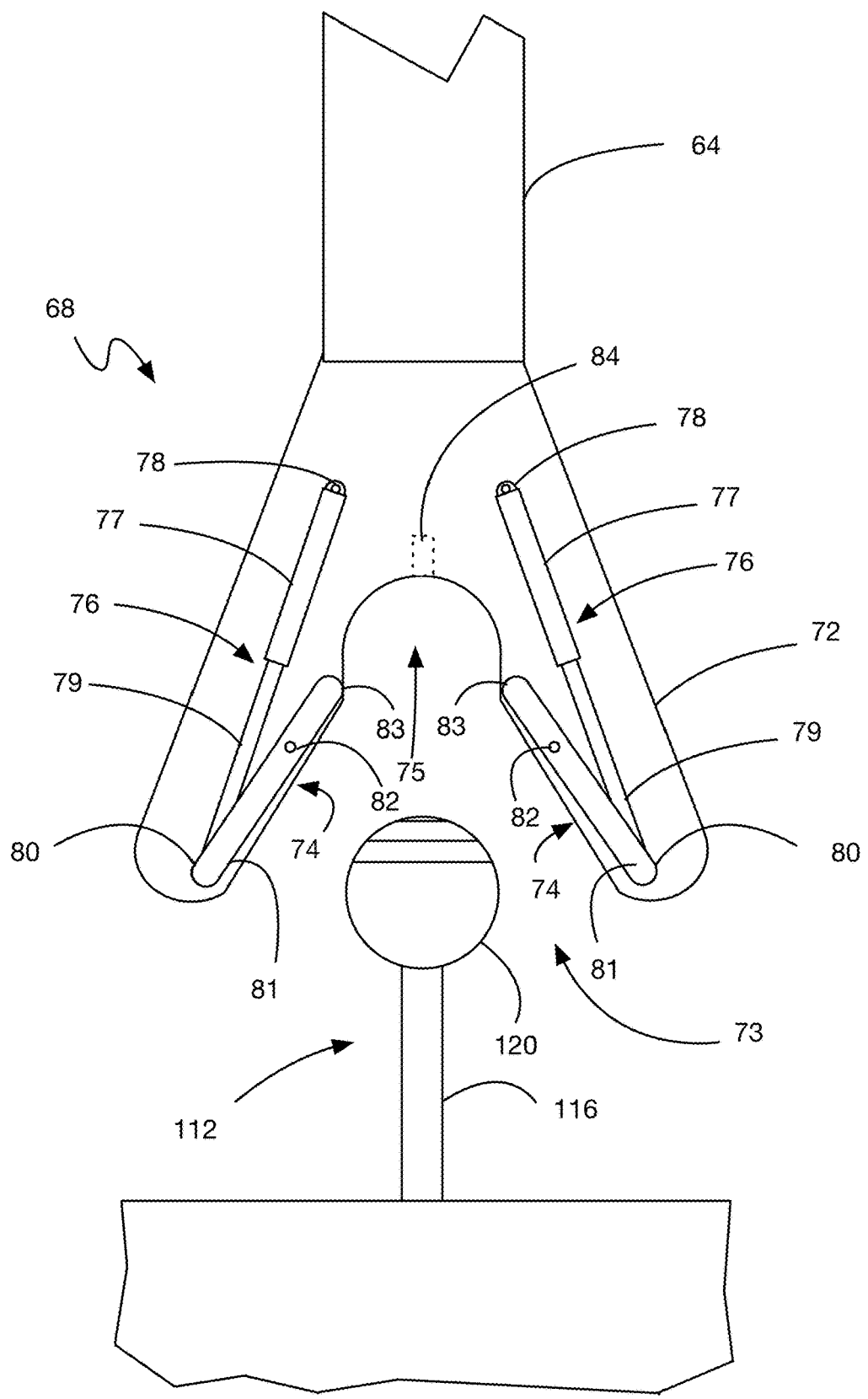
FIG. 7A is a partial section view of an anchor-capture device of the rotary-wing aircraft of FIG. 1 before capture of an anchor of the fixed-wing aircraft.

FIG. 7A illustrates the anchor-capture device 68 being aligned with an anchor 112 in preparation for capturing the anchor 112. As can be seen, the aircraft engagement member 60 is extended, the anchor-capture device 68 is aligned vertically over the anchor 112, and the engagement members 81 of the anchor-locking members 76 are in the release position to enable the ball portion 120 of the anchor 112 to enter the anchor receptacle 75. Prior to capture of the anchor 112 by the anchor-capture device 68, images being captured by the imaging sensor 84 are processed by the central controller 58 of the capture-and-release aircraft 20 to determine the alignment of the anchor-capture device 68 relative to the anchor 112. In order to align the anchor-capture device 68 with the anchor 112, the central controller 58 controls the articulating arm 64 to position the anchor-capture device 68. Once the anchor-capture device 68 is generally aligned with the anchor 112, the central controller 58 extends the articulating arm 64 towards the anchor 112, adjusting for any misalignments introduced by the extension or as a result of slight shifts between the capture-and-release aircraft 20 and the fixed-wing aircraft 100.

Once the anchor-capture device 68 slightly covers the anchor 112, the frusto-conical surface 74 of the anchor-capture device 68 can be used to guide the anchor-capture device 68 to capture the anchor 112. The frusto-conical surface 74 and an inner surface of the anchor receptacle 75 are made of a material that can withstand knocking and sliding engagement of the anchor 112 thereagainst. The anchor 112 may be deemed to be sufficiently within the anchor receptacle 75 (i.e., in an engageable position) to enable securing of the anchor by using a proximity sensor, such as a range finder, a tactile sensor, a Hall effect sensor, a short-range radio signal antenna, etc. Alternatively, the sensor unit 84 can act as a proximity sensor by measuring the decrease in light received by the sensor unit 84 as the anchor blocks light thereto, by detecting radio frequency signals, etc.

Figure 7B:
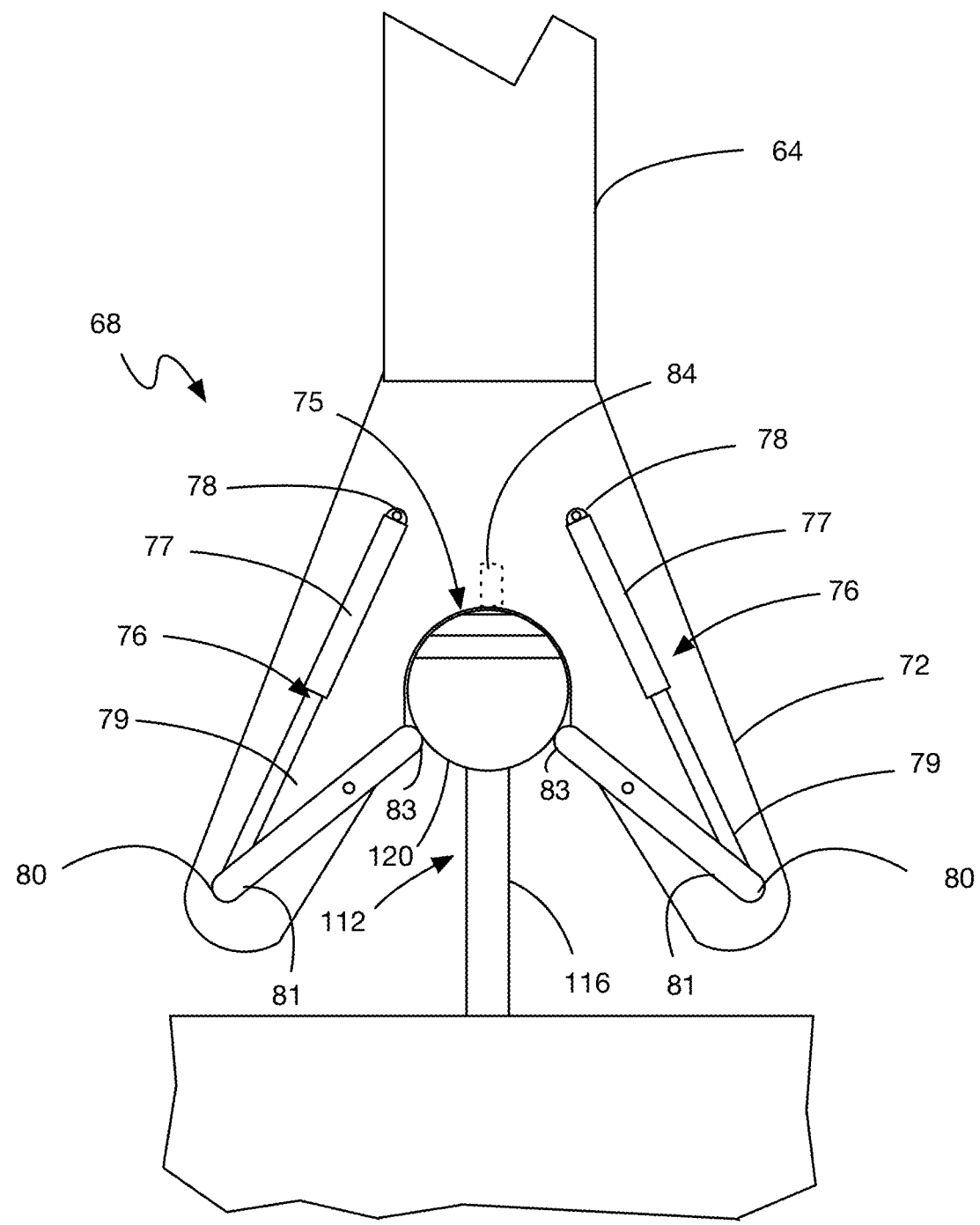
FIG. 7B is a partial section view of the anchor-capture device of FIG. 5 after capture of a fixed-wing aircraft.

Upon guidance of the anchor 112 into the anchor receptacle 75 to an engageable position as is shown in FIG. 7B, the piston 79 is withdrawn into the hydraulic cylinder 77 to pivot the engagement member 81 to a locking position in which a second anchor-engaging end 83 extends into the generally conical opening 73. The engagement members 81, once in a locking position, hold firmly onto the anchor 112.

The engine(s) of the fixed-wing aircraft 100 can then be extinguished, typically gradually, to enable the capture-and-release aircraft 20 to assume control of the fixed-wing aircraft 100. The capture-and-release aircraft 20 may optionally signal the fixed-wing aircraft 100 via wireless or optical means or through a central communication authority shortly after successful capture so that the fixed-wing aircraft may begin operations to extinguish its engines. In a similar fashion, the fixed-wing aircraft 100 can signal back to the capture-and-release aircraft 20 that its engines have been completely shutoff, so that the capture-and-release aircraft 20 can begin final maneuvers for touchdown.

Figure 8:
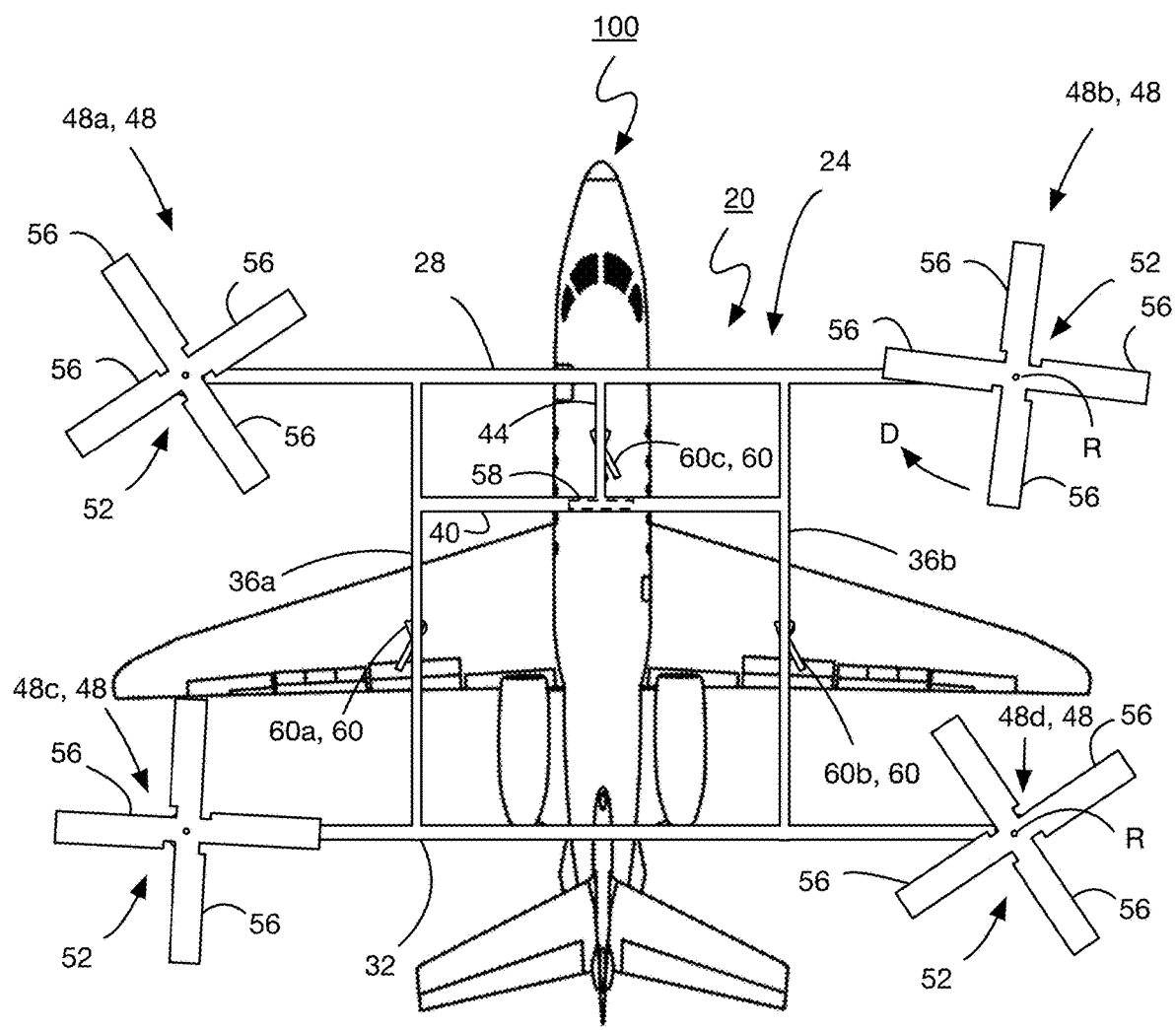
FIG. 8 is a top view of the rotary-wing aircraft of FIG. 1 retaining the fixed-wing aircraft of FIG. 3 via the anchors.
Figure 9:
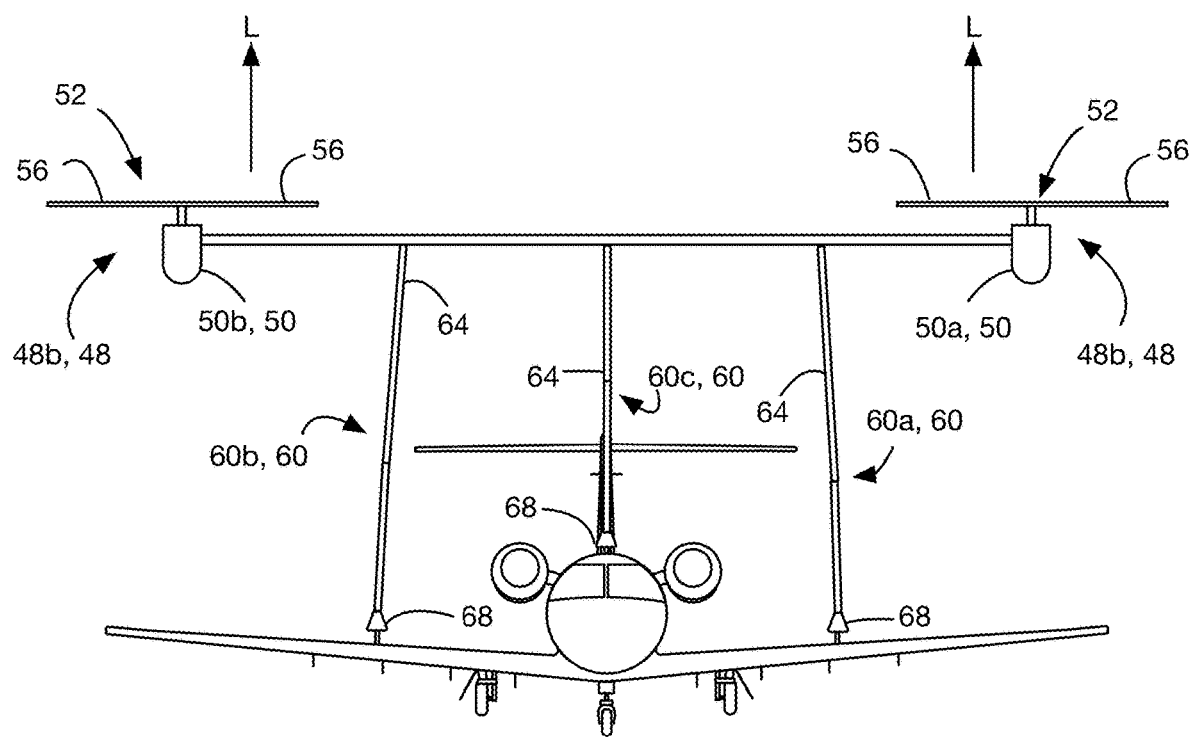
FIG. 9 is a front view of the rotary-wing aircraft of FIG. 1 retaining the fixed-wing aircraft of FIG. 3 via the anchors.

FIGS. 8 and 9 show the fixed-wing aircraft 100 having been engaged and secured by the capture-and-release aircraft 20 via the anchors 112. The dimensions and configuration of the frame 24 of the capture-and-release aircraft 20 has the rotor units positioned so that, when the aircraft engagement members retain the set of anchors via the anchor-capture devices, downwash and wake turbulence from the rotor units is generally unimpeded by the fixed-wing aircraft 100 that the capture-and-release aircraft 20 has captured. This design also improves stability, balance and resilience to turbulence when handling the captured fixed-wing aircraft 100. In addition, the aircraft engagement members 60 are secured to the frame 24 of the capture-and-release aircraft 20 as directly above the locations of the anchors as possible.

The fixed-wing aircraft 100 can then be transported by the capture-and-release aircraft 20 to a landing spot. Upon landing the fixed-wing aircraft 100, the capture-and-release aircraft 20 can release the fixed-wing aircraft 100. In order to release the fixed-wing aircraft 100, each piston 79 of each anchor-capture device 68 is extended out of the hydraulic cylinder 77 to pivot the engagement member 81 to a release position within the profile of the generally conical body 72. The ball portion 120 of each anchor 112 is then free to exit the anchor receptacle 75, allowing the capture-and-release aircraft 20 to take off unencumbered by the fixed-wing aircraft 100. The anchors 112 of the fixed-wing aircraft 100 may then be withdrawn to the retracted position within the wings 104 and the fuselage 108 of the fixed-wing aircraft 100.

In order to assist the fixed-wing aircraft 100 to take off, the anchors 112 of the fixed-wing aircraft 100 are extended into an upright position. The capture-and-release aircraft 100 then takes flight and descends upon the fixed-wing aircraft 100, aligning the anchor-capture devices 68 with the anchors of the fixed-wing aircraft 100 during the process. After the anchor-capture devices 68 are resting atop of the ball portions 120 of the anchors 112, each piston 79 of each anchor-capture device 68 is withdrawn into the hydraulic cylinder 77 to pivot the engagement member 81 to a locking position in which the second anchor-engaging end 83 extends into the generally conical opening 73. The engagement members 81, once in a locking position, hold firmly onto the anchor 112. The capture-and-release aircraft 20 can then take off, bearing the load of the fixed-wing aircraft 100 for the ascent, as well as assuming responsibility for the balance and stability of both the capture-and-release aircraft 20 and the fixed-wing aircraft 100. Once the capture-and-release aircraft 20 has reached a sufficient altitude for a safe forward acceleration, the capture-and-release aircraft 20 either stops ascending further and accelerates the fixed-wing aircraft 100 in a forward direction or begins accelerating forward while continuing to ascend as is needed in that situation. This continues until the capture-and-release aircraft 20 has achieved at least the minimum flying speed of the fixed-wing aircraft 100. Alternatively, forward acceleration of the fixed-wing aircraft 100 can be assisted or assumed entirely by the propulsion means of the fixed-wing aircraft 100. As the fixed-wing aircraft 100 accelerates through the air, the lift that it generates increases, with the capture-and-release aircraft 20 providing supplemental lift as needed. The anchors 112 of the fixed-wing aircraft 100 are then simultaneously released from the anchor-capture devices 68 to enable the fixed-wing aircraft 100 to fly under its own power. The capture-and-release aircraft 20 then retracts its aircraft engagement members 60 and ascends to provide clearance for the fixed-wing aircraft 100 before turning around and returning to base. The fixed-wing aircraft 100, now fully released, can take flight under its own power and continue with the rest of its take-off procedure on its own. The fixed-wing aircraft 100 fully retracts its anchors 112 into the wings 104 and the fuselage 108.

Figure 10A:
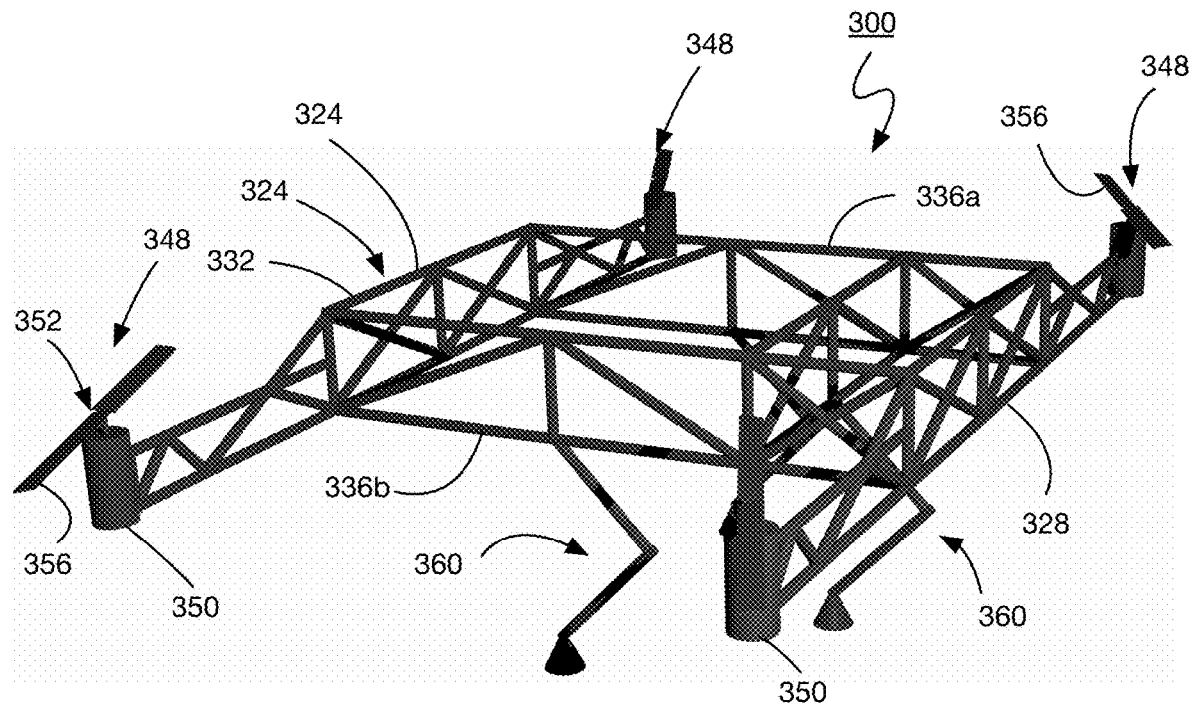
FIGS. 10A to 10C are side perspective views of a rotary-wing aircraft for capturing and releasing fixed-wing aircraft in accordance with another embodiment.
Figure 10B:
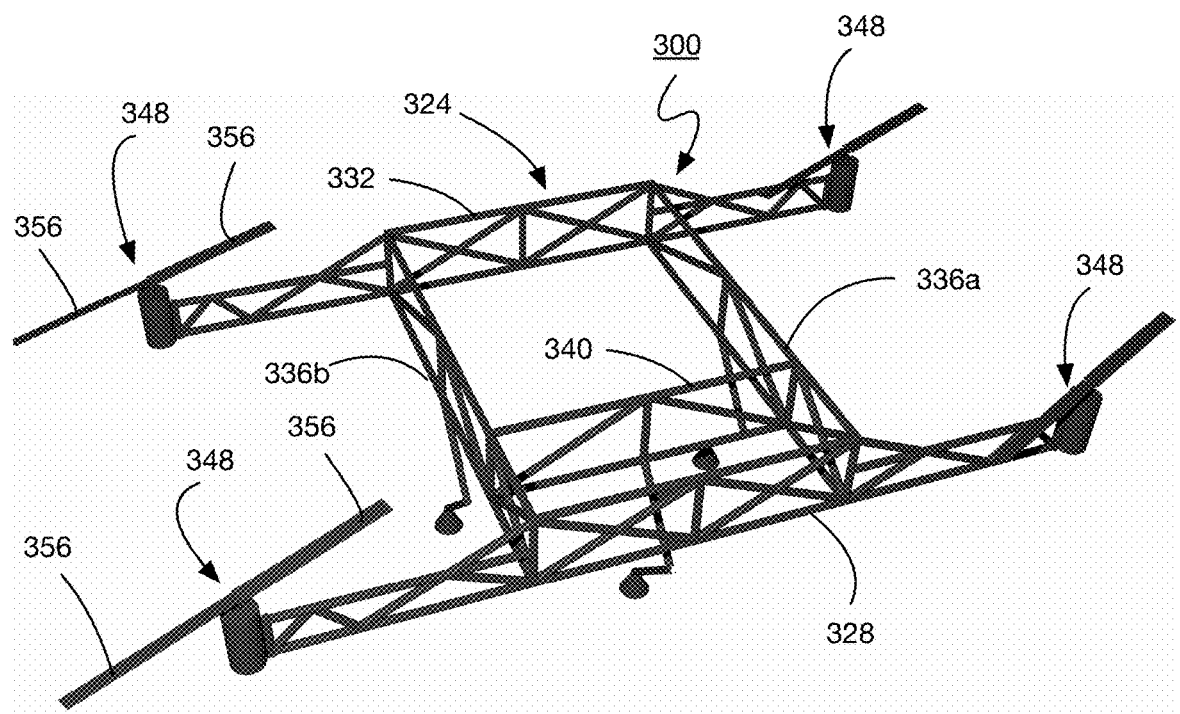
Figure 10C:
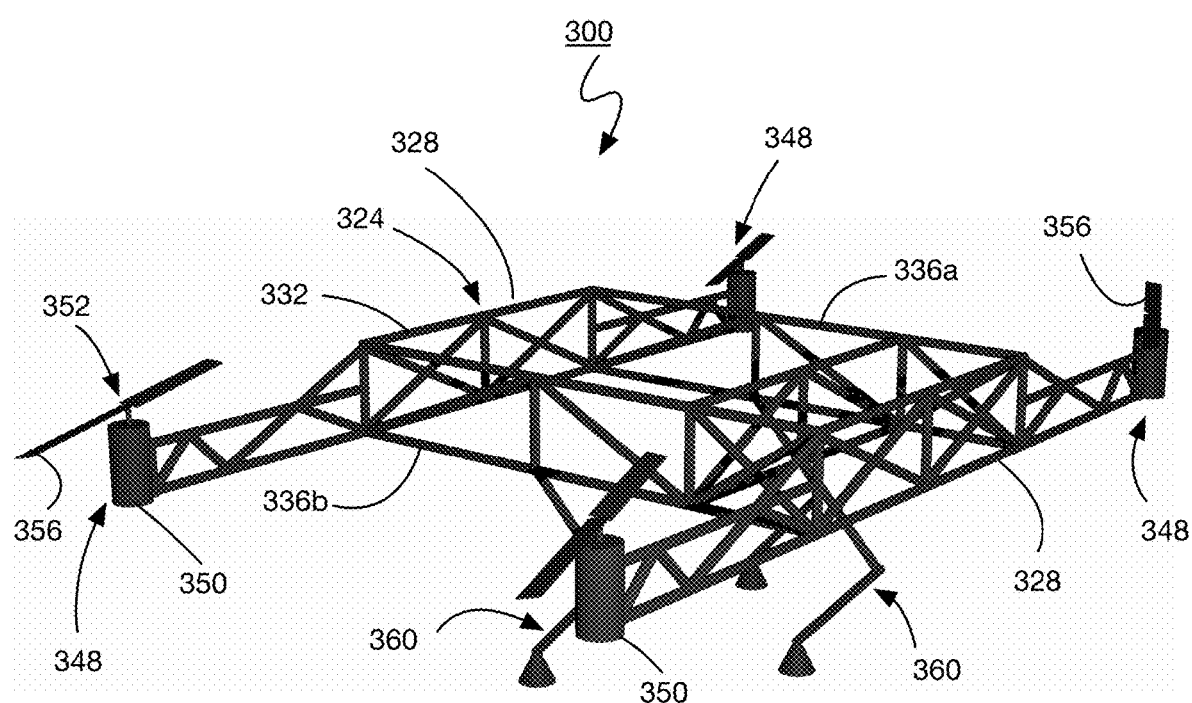

FIGS. 10A to 10C show a capture-and-release aircraft 300 in accordance with another embodiment. The capture-and-release aircraft 300 has a trussed frame 324 to provide strength and rigidity. The truss frame 324 is similar to the frame 24 of the capture-and-release aircraft 20 of FIG. 1, and has a front trussed cross-member 328 and a rear trussed cross-member 332 that are spanned by two lateral trussed members 336a, 336b. An intermediate trussed cross-member 340 bridges the two lateral trussed members 336a, 336b between the front trussed cross-member 328 and the rear trussed cross-member 332. The frame 324 is constructed primarily of aluminum, but can be made from any other suitable material.

Four rotor units 348 are secured to the lateral ends of the front trussed cross-member 328 and the rear trussed cross-member 332. Each rotor unit 348 includes a motor 350 that drives a rotor 352 having two blades 356. The two blades 356 of the rotor 352 loosely define a plane. The blades 356 are pitched relative to the plane of the rotor 352 and generate lift when the rotor 352 is rotated. The rotation axes of the rotor units 348 are generally parallel, and the planes of the rotors 352 are generally co-planar.

Two of the motors 350 and 350 on opposite corners of the trussed frame 324 drive their respective rotors 352 clockwise and the other two motors 350 drive their respective rotors 352 counter-clockwise. The use of independent variation of the speed of each rotor 352 provides directional and speed control to the capture-and-release aircraft 300. By changing the speed of each motor 350 and thus of each rotor 352, a desired total lift can be generated, its center can be controlled both laterally and longitudinally, and a desired total torque, or turning force, can be generated to cause the capture-and-release aircraft 300 to yaw either right or left.

Figure 11:
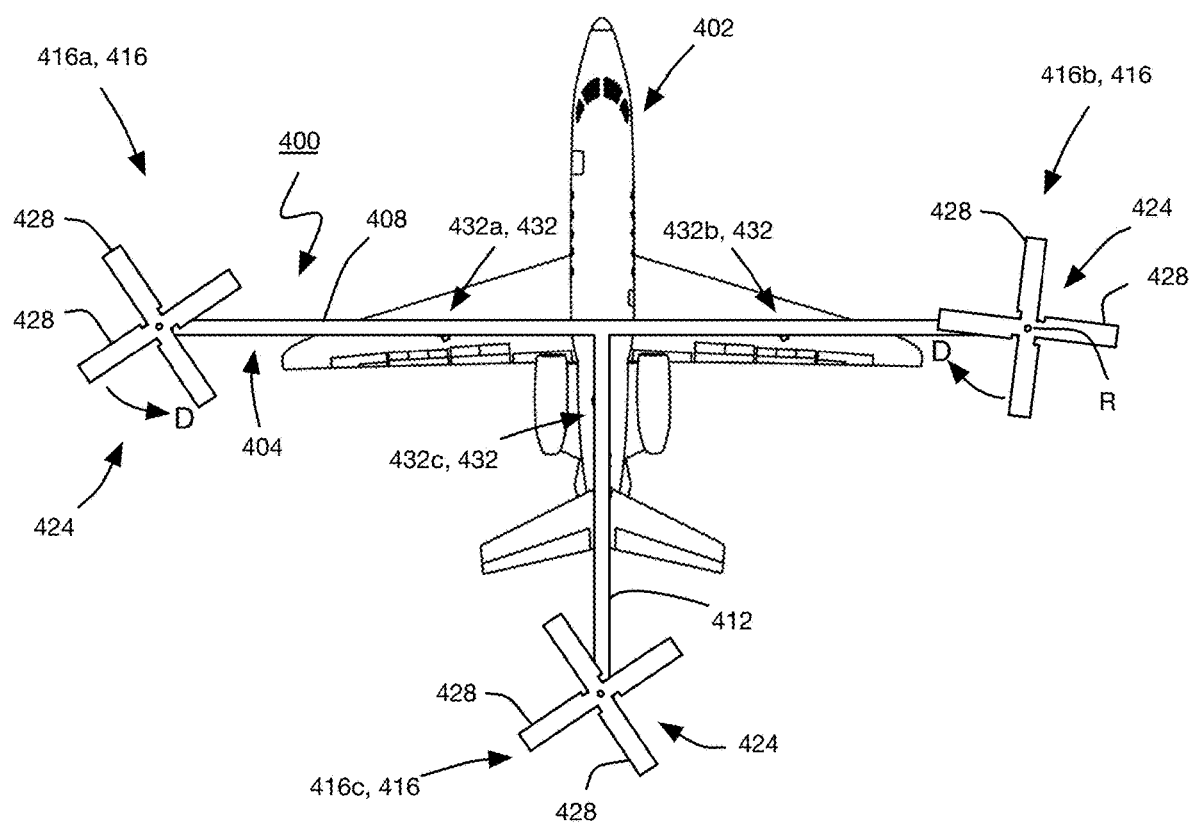
FIG. 11 is a top view of a capture-and-release aircraft coupled to an aircraft in accordance with another embodiment.
Figure 12:
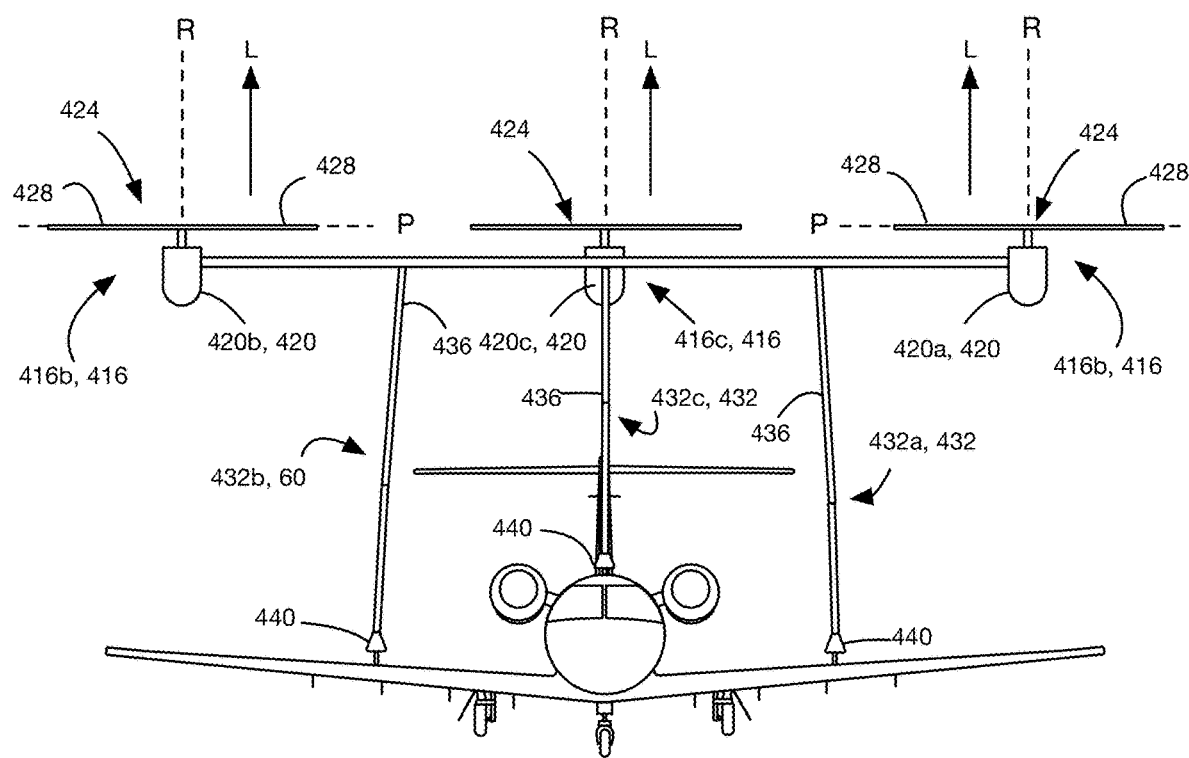
FIG. 12 is a front view of the capture-and-release aircraft coupled to the aircraft of FIG. 11.

FIGS. 11 and 12 show a capture-and-release aircraft 400 coupled to a fixed-wing aircraft 402 in accordance with another embodiment. The capture-and-release aircraft 400 has a frame 404 that includes a front cross-member 408 extending laterally from a longitudinal member 412 that extends rearwardly past the tail of the aircraft 402. The frame 404 can be constructed of any suitable material, such as aluminum.

Three rotor units 416a, 416b, and 416c (collectively, rotor units 416) are provided. One is secured to each lateral end of the front cross-member 408, and the third to a rear end of the longitudinal member 412. Each rotor unit 416 includes a motor 420 that drives a rotor 424 having four blades 428. The four blades 428 of the rotor 424 loosely define a plane P. The blades 428 are pitched relative to the plane of the rotor 424 and generate an upward force L, generally referred to as lift, when the rotor 424 is rotated in a rotation direction D about a rotation axis R. The rotation axes R of the rotor units 416 are generally parallel, and the planes P of the rotors 424 are generally co-planar.

A first of the motors 420a at one end of the front cross-member 408 drives its respective rotor 424 clockwise, and a second of the motors at another end of the front cross-member 408 drives its respective rotor 424 counter-clockwise. A third of the motors 420c at the rear end of the longitudinal member 412 drives its rotor 424 counter-clockwise. This motor can also be rotated at the attachment point to the longitudinal member. The use of independent variation of the speed of each rotor 424 and the rotation of the third motor provides directional and speed control to the capture-and-release aircraft 400.

The motors 420 and rotors 424 have characteristics that define a maximum load weight that the capture-and-release aircraft 400 can safely capture mid-flight and guide to touch down, and pick up from a stationary position on the ground and accelerate to a minimum flying speed for a fixed-wing aircraft.

A central controller (not shown) is contained within the front cross-member 408 of the frame 404, and includes an auto-pilot system and controls the general operation of the capture-and-release aircraft 400. The central controller determines the general position of a fixed-wing aircraft to be captured and controls the motors 420 to guide the capture-and-release aircraft 400 to a position for engaging the fixed-wing aircraft. In addition, the central controller is programmed to control the capture-and-release aircraft 400 during landing and take-off routines. The central controller is informed of the GPS co-ordinates, flight trajectory and identification of the fixed-wing aircraft, either via an external communication authority or directly from the fixed-wing aircraft itself. Still further, the central controller includes a guidance system that controls the capture and release of fixed-wing aircraft as will be described below.

Three aircraft engagement members 432 are secured to and extend under the frame 404. Two of the aircraft engagement members 432a and 432b are secured to the front cross-member 408, and a third aircraft engagement member 432c is secured to the longitudinal member 412. The use of at least three aircraft engagement members 432 enables the capture-and-release aircraft 400 to securely and stably capture and transport the fixed-wing aircraft 402, even with more challenging wind conditions.

Each aircraft engagement member 432 includes an articulating arm 436 and an anchor-capture device 440 coupled to the articulating arm 436 at a distal end thereof. Each articulating arm 436 is a robotic arm controlled by the central controller and has three or more degrees of freedom. The articulating arms 436 are of sufficient length so that when they are fully extended, the capture-and-release aircraft 400 is a safe distance above the top of the fixed-wing aircraft 402. This safe distance is approximately half the total nose-to-tail length of the fixed-wing aircraft and is determined by the stability of flight characteristics of both the capture-and-release aircraft 400 and the fixed-wing aircraft under the wind conditions at the time of engagement and is intended to minimize the effects of both downwash and wake turbulence arising from the capture-and-release aircraft 400 on the fixed-wing aircraft below.

The design of the capture-and-release aircraft 400 can be made with no additional supporting structural members as the load points fall directly under the frame lines, thus making the frame 404 more stable and lighter at the same time and reducing the number of failure points.

Mid-Flight Payload Transfer

The capture-and-release aircraft and the fixed-wing aircraft can be adapted to execute mid-flight cargo exchange operations.

Figure 13:
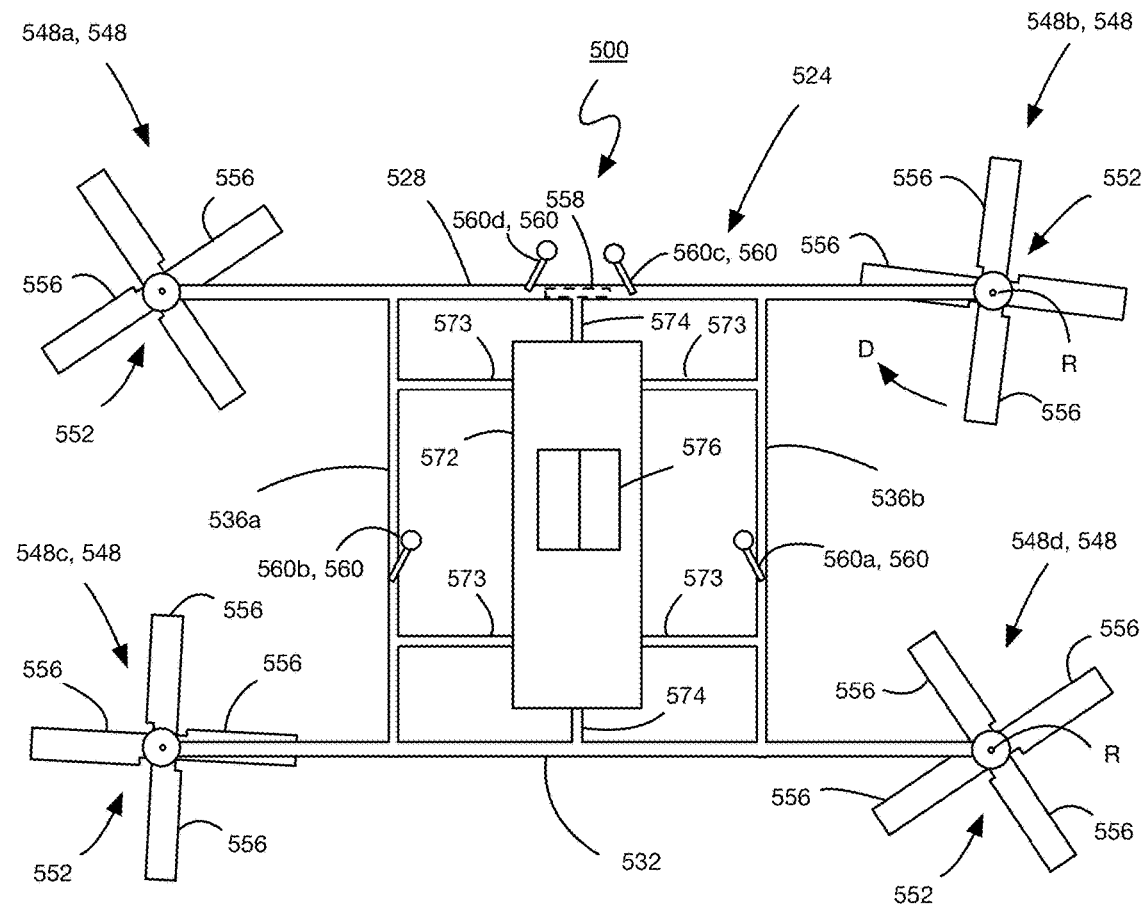
FIG. 13 is a top view of a capture-and-release aircraft in accordance with a further embodiment.
Figure 14:
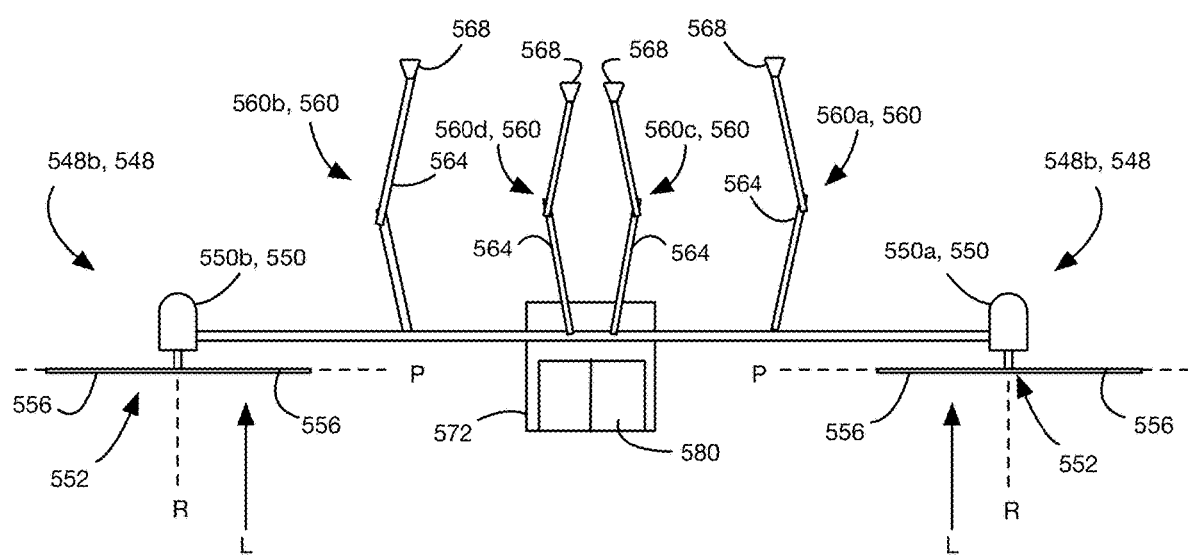
FIG. 14 is a front view of the capture-and-release aircraft of FIG. 13.

FIGS. 13 and 14 show a capture-and-release aircraft 500 in accordance with another embodiment. The capture-and-release aircraft 500 has a frame 524 that includes a front cross-member 528 and a rear cross-member 532 that are spanned by two lateral members 536a, 536b. The frame 524 is constructed primarily of aluminum, but can be made from any other suitable material.

Four rotor units 548a, 548b, 548c, and 548d (collectively, rotor units 548) are secured to the lateral ends of the front cross-member 528 and the rear cross-member 532. Each rotor unit 548 includes a motor 550 that drives a rotor 552 having four blades 556. The four blades 556 of the rotor 552 loosely define a plane P. The blades 556 are pitched relative to the plane of the rotor 552 and generate an upward force L, generally referred to as lift, when the rotor 552 is rotated in a rotation direction D about a rotation axis R. The rotation axes R of the rotor units 548 are generally parallel, and the planes P of the rotors 552 are generally co-planar.

The rotor units 548 of the capture-and-release aircraft 500 are operated much in the same manner as those of the capture-and-release aircraft FIG. 1.

A central controller 558 is contained within the intermediate cross-member 540 of the frame 524, and includes an auto-pilot system and controls the general operation of the capture-and-release aircraft 500. The central controller 558 determines the general position of a fixed-wing aircraft to be captured and controls the motors 550 to guide the capture-and-release aircraft 500 to a position for engaging the fixed-wing aircraft. In addition, the central controller 558 is programmed to control the capture-and-release aircraft 500 during landing and take-off routines. The central controller 558 is informed of the GPS co-ordinates, flight trajectory and identification of the fixed-wing aircraft, either via an external communication authority or directly from the fixed-wing aircraft itself. Still further, the central controller 558 includes a guidance system that controls the capture and release of fixed-wing aircraft as will be described below.

Four aircraft engagement members 560 are secured to and extend up from the frame 524. Two of the aircraft engagement members 560a and 560b are secured to the lateral members 536a and 536b respectively, and another two of the aircraft engagement members 560c and 560d are secured to the front cross-member 528.

Each aircraft engagement member 560 includes an articulating arm 564 and an anchor-capture device 568 coupled to the articulating arm 564 at a distal end thereof. Each articulating arm 564 is a robotic arm having one or more motors and controlled by the central controller 558 to articulate the articulating arm 564. The articulating arms 564 have three or more degrees of freedom. The articulating arms 564 are of sufficient length so that when they are fully extended, the capture-and-release aircraft 500 is a safe distance below the bottom of a fixed-wing aircraft. This safe distance is approximately half the total nose-to-tail length of the fixed-wing aircraft and is determined by the stability of flight characteristics of both the capture-and-release aircraft 500 and the fixed-wing aircraft under the wind conditions at the time of engagement. Since the only turbulence exerted by the fixed-wing below is its wake turbulence, which is more prevalent near its wing tips, the capture-and-release aircraft can attach itself closer to the fixed-wing aircraft. It could also pull itself up closer to the fixed-wing aircraft after engagement to the anchors to facilitate cargo transfer.

The capture-and-release aircraft 500 is configured for use with a fixed-wing aircraft having anchors extending downwardly. Preferably, a fixed-wing aircraft has two anchors underneath its wings and at least a third anchor and optionally a fourth anchor beneath its fuselage forward from the wing anchors.

A cargo hold 572 is secured to the frame 524 in a central position via four lateral support members 573 extending from the lateral members 536a, 536b, and two longitudinal support members 574 extending from the front cross-member 528 and the rear cross-member 532. A pair of top cargo bay doors 576 open along a top surface of the cargo hold 572. Another pair of end cargo bay doors 580 facilitate loading of the cargo hold 572 while the capture-and-release aircraft 500 is grounded. The top cargo bay doors 576 align with a cargo access hatch on the bottom of the fixed-wing aircraft when the anchor-capture devices 568 are coupled to the anchors of the fixed-wing aircraft.

The interior of the fixed-wing aircraft can be modified to securely hold cargo in standardized containers, quite like shipping containers, although these containers could be scaled differently depending on the scale of the operation. A jack mechanism, such as a scissors jack, can be fitted into the inside top of the capture-and-release aircraft 500 to raise containers up through the access hatch to move a container up into the fuselage of the fixed-wing aircraft. Likewise, the jack mechanism can also be used to accept containers from the fixed-wing aircraft and lower them into the cargo hold 572 of the capture-and-release aircraft 500. Alternatively or additionally, the fixed-wing aircraft can be fitted with a crane or hoist to raise and lower cargo from and to the cargo hold 572 of the capture-and-release aircraft 500.

The fixed-wing aircraft can also be provided with one or more docking anchors on the bottom of the fuselage similar to those previously described that are meant to couple with aircraft docking anchor-capture devices at the top of the cargo hold section of the capture-and-release aircraft. This set of anchors and anchor-capture devices can provide a safe and stable lock and support for payload transfer between the top of the capture-and-release aircraft and the bottom of the fixed-wing aircraft's fuselage.

An aerodynamic contour can extend fully around the cargo exchange opening of the capture-and-release aircraft that stays just slightly off of the top of the fixed-wing aircraft's fuselage when docked. The aerodynamic contour can divert airflow around the cargo exchange zone, so as to minimize the effect of turbulent airflow around the cargo and crane apparatus during cargo exchange.

The jack mechanism of the cargo hold 572 and the crane or hoist of the fixed-wing aircraft can be fitted with matching coupling devices such that, at the moment of exchange, the jack mechanism and the crane (the fixed-wing aircraft crane and the capture-and-release aircraft jack mechanism) securely hold on to the container before one releases the container and the other takes over to complete the exchange.

In order to perform a cargo transfer, the capture-and-release aircraft 500 secures the fixed-wing aircraft much as described above, except from a bottom side and that there are additional docking anchors to be secured. Once the capture-and-release aircraft 500 is secured to the fixed-wing aircraft via the anchors, the motors of the articulating arms 564 are controlled by the central controller 558 to move the cargo hold 572 from a position in which the cargo hold 572 is spaced from the fixed-wing aircraft and a second position in which the cargo hold 572 is adjacent the fixed-wing aircraft. The cargo doors 576 can slide open on both the capture-and-release aircraft 500 and the fixed-wing aircraft.

The jack mechanism of the capture-and-release aircraft 500 can first raise its cargo container and hold position at the exchange point. The fixed-wing aircraft's crane can reach out and capture the container at the exchange point. The jack mechanism of the capture-and-release aircraft 500 can release its hold on the container. The fixed-wing aircraft's crane can raise the container into the cargo hold of the fixed-wing aircraft and secure it to its holding position. Further, the fixed-wing aircraft's crane can pick up a container from its hold that is intended to be delivered to the capture-and-release aircraft 500 and present it at the exchange point. The jack mechanism of the capture-and-release aircraft 500 can reach out and capture the container. The fixed-wing aircraft's crane can release its hold on the container. The jack mechanism of the capture-and-release aircraft 500 can retract and secure the container within the cargo hold 572 of the capture-and-release aircraft 500.

When there are no further containers to exchange, the cargo doors can be slid shut on both the capture-and-release aircraft 500 and the fixed-wing aircraft. Articulation of the articulating arms 564 enables the frame 524 and the cargo hold 572 to be moved away from the fixed-wing aircraft, and the capture-and-release aircraft 50 can release the locks of the docking anchor-capture devices so as to release the anchors and thus separate from the fixed-wing aircraft. The aircraft engagement members 560 of the capture-and-release aircraft 500 can extend back out into a capture position.

It is to be understood that the capture-and-release aircraft for transferring cargo to and from a fixed-wing aircraft can also couple to the fixed-wing aircraft from above, much like the capture-and-release aircraft of FIGS. 1 to 10C. In this scenario, the cargo hold of the capture-and-release aircraft would open on its bottom surface and have a crane or hoist to raise and lower cargo through an opening in the top of the fuselage of the fixed-wing aircraft to which it is coupled.

Passenger Transfer

Passengers can be exchanged via the capture-and-release aircraft using the same general procedure as for cargo, with a few modifications. Instead of containers being exchanged, passenger cars are exchanged. Secure seating and relevant habitability conditions (temperature, humidity, and oxygen levels) can be provided within the passenger cars. The aesthetics and ergonomics of the cargo hold areas within the fixed-wing aircraft and the capture-and-release aircraft can be modified to take habitability into account. The crane systems used for exchanging the passenger cars can be modified to ensure smooth operation and transfer of the passenger cars.

Refueling

Refueling of liquid fuels can be performed much in the same way as a cargo transfer as described above. Instead of transferring containers, the capture-and-release aircraft's crane can acquire and lower the refueling hose down to the exchange point, and the fixed-wing aircraft's crane can acquire and extend its fuel receiver hose up to the exchange point such that the receiver receptacle can engage the refueling nozzle. The fixed-wing aircraft can then receive fuel from the capture-and-release aircraft. When the fuel transfer is complete, the fuel flow is stopped. After a few seconds after the fuel flow has completely stopped, the fixed-wing aircraft and the capture-and-release aircraft release their fuel hoses and retract their cranes.

In a similar fashion, charged and discharged batteries may be exchanged mid-flight for electric fixed-wing aircraft, while spent and full hydrogen fuel cells may be exchanged mid-flight for fuel cell powered fixed-wing airplanes.

While, in the above-described embodiments, the capture-and-release aircraft 20 is described as having four rotor units, it may be desirable to provide three in some cases, or five or more in some other circumstances.

While, in the above-described embodiments, the capture-and-release aircraft 20 is described as having three aircraft engagement members, it may be desirable to provide four or more in some circumstances where additional stability or load distribution is desired.

The optical pattern can be any pattern of demarcations and/or light-emitting elements. While in the above-described embodiment, the pattern of demarcations is a bullseye, other exemplary patterns of demarcations include one or more geometric shapes, colors, etc. In another embodiment, the anchor 112 can be painted entirely in a single color and its shape and color can themselves form the optical pattern. The demarcations can be passively illuminated via ambient light or via one or more light sources of the capture-and-release aircraft. Alternatively, the demarcations can be retro-reflective and a light source that is visible or invisible (such as with infrared light) to humans can be used to illuminate them.

The optical pattern can also or alternatively include one or more sources of illumination, such as LED light-emitting beacons, or can even be reflective or retroreflective. The optical pattern can include the pattern of illumination and non-illumination, such as strobing, by the illumination elements of the anchors.

Further, in other embodiments, the optical pattern can include a pattern of demarcations or sources of illumination on a surface of the wing or fuselage of a fixed-wing aircraft around the anchors.

The capture-and-release aircraft can be employed to transfer passengers, cargo, and/or fuel on or off of a fixed-wing aircraft in flight, without requiring the fixed-wing aircraft to land.

Variation of the load that can be captured and/or released by a capture-and-release aircraft can be made by varying the structure and materials, the structure size, the motor power, the rotor type and size, etc.

While the central controller is described as a single physical computer, it will be appreciated that the computer system can include two or more physical computers in communication with each other. Accordingly, while the embodiment shows the various components of the computer system residing on the same physical computer, those skilled in the art will appreciate that the components can reside on separate physical computers.

The capture-and-release aircraft can be optionally powered by tilt engines and/or propellers. This configuration provides the capture-and-release aircraft with the ability to propel forward without requiring to pitch downwards simplifying the in-flight capture maneuver as the two airframes would essentially be parallel to each other.

The aircraft engagement members of the capture-and-release aircraft can optionally support lateral displacements so that they can be more finely placed over the anchors of the fixed-wing aircraft and thus support fixed-wing aircraft of different sizes, wing-spans, and/or anchor-placement configurations.

The capture-and-release aircraft can be built for various scales of operation—from very large sizes and load capacities for larger heavier aircraft to smaller sizes for single seater aircraft and smaller drones. Hobby grade capture-and-release aircraft could be built to support scale and hobby airplane models.

In other embodiments, the set of sensors can additionally or alternatively include one or more sensors on an outer surface of the anchor receptacles. For example, optical sensors can be positioned on an outer surface of the anchor receptacles and positioned to have a line of sight to view an anchor as the anchor receptacle is being aligned for receiving the anchor.

The above-described embodiments are intended to be examples of the present invention and alterations and modifications may be effected thereto, by those of skill in the art, without departing from the scope of the invention that is defined solely by the claims appended hereto.

The invention claimed is:

1. A capture-and-release aircraft for capturing and releasing a fixed-wing aircraft, comprising:
a frame;
a set of at least three rotor units secured to the frame, each of the at least three rotor units being configured to generate vertical lift; and
a set of at least three aircraft engagement members secured to the frame, each of the at least three aircraft engagement members comprising:
an anchor-capture device configured to releasably couple to a corresponding one of a set of anchors of a fixed-wing aircraft, and
an articulating arm coupled to the anchor-capture device and controllable to move the anchor-capture device relative to the frame through at least two dimensions to align the anchor-capture device with the corresponding one of the set of anchors of the fixed-wing aircraft,
a first and a second of the at least three aircraft engagement members being spaced laterally to position the first of the at least three aircraft engagement members towards a first wing of the fixed-wing aircraft to engage the corresponding one of the set of anchors positioned on the first wing, and a second of the at least three aircraft engagement members towards a second wing of the fixed-wing aircraft on an opposite lateral side of the fixed-wing aircraft from the first wing to engage the corresponding one of the set of anchors positioned on the second wing.

2. The capture-and-release aircraft according to claim 1, wherein the capture-release aircraft further comprises a refueling hose extendable towards a fuel receptacle of the fixed-wing aircraft.

3. The capture-and-release aircraft according to claim 1, wherein a third of the at least three aircraft engagement members is spaced longitudinally in a fore or aft direction from at least one of the first and the second of the at least three aircraft engagement members to engage the corresponding one of the set of anchors that is spaced longitudinally in a fore or aft direction from at least one of the corresponding ones of the set of anchors to which the first and the second aircraft engagement members releasably couple.

4. The capture-and-release aircraft according to claim 3, wherein each of the aircraft engagement members comprises a proximity sensor for detecting an engageable position of the corresponding one of the set of anchors of the fixed-wing aircraft.

5. The capture-and-release aircraft according to claim 3, wherein the capture-and-release aircraft further comprises a cargo, battery, fuel cell, and/or passenger hold secured to the frame, and wherein each of the aircraft engagement members further comprises at least one motor that, when the anchor-capture devices are coupled to the anchors of the fixed-wing aircraft, can move the cargo, battery, fuel cell, and/or passenger hold between a first position in which the cargo, battery, fuel cell and/or passenger hold is spaced from the fixed-wing aircraft and a second position in which the cargo, battery, fuel cell, and/or passenger hold is adjacent or within the fixed-wing aircraft.

6. The capture-and-release aircraft according to claim 3, wherein each of the anchor-capture devices comprises an anchor receptacle in which one of the anchors is received.

7. The capture-and-release aircraft according to claim 3, wherein each of the aircraft engagement members further comprises at least one sensor for detecting an alignment of the anchor-capture device coupled to the articulating arm of the aircraft engagement member with the corresponding one of the set of anchors of the fixed-wing aircraft, and wherein the capture-and-release aircraft further comprises a guidance system coupled to the each of the articulating arm and the at least one sensor to align the anchor-capture device with the corresponding one of the set of anchors.

8. The capture-and-release aircraft according to claim 7, wherein each of the anchor-capture devices comprises an anchor receptacle in which one of the anchors is received.

9. The capture-and-release aircraft according to claim 8, wherein the at least one sensor comprises at least one optical sensor positioned on an inner surface of the anchor receptacle.

10. The capture-and-release aircraft according to claim 8, wherein the at least one sensor comprises at least one optical sensor positioned on an outer surface of the anchor receptacle.

11. The capture-and-release aircraft according to claim 7, wherein the at least one sensor comprises at least one optical sensor.

12. The capture-and-release aircraft according to claim 11, wherein the at least one optical sensor is positioned on the anchor-capture device.

13. The capture-and-release aircraft according to claim 11, wherein the guidance system processes data from the at least one sensor to detect an optical pattern one of on or adjacent to the corresponding one of the set of anchors to facilitate detection of the alignment of the anchor-capture devices with the anchors of the fixed-wing aircraft.

14. The capture-and-release aircraft according to claim 13, wherein the optical pattern comprises a light-emitting beacon.

15. The capture-and-release aircraft according to claim 13, wherein the optical pattern comprises a pattern of demarcations on a surface of the anchors of the fixed-wing aircraft.

16. The capture-and-release aircraft according to claim 13, wherein the optical pattern comprises a pattern of demarcations on a surface of the fixed-wing aircraft adjacent the anchors of the fixed-wing aircraft.

* * * * *